Figure 1:
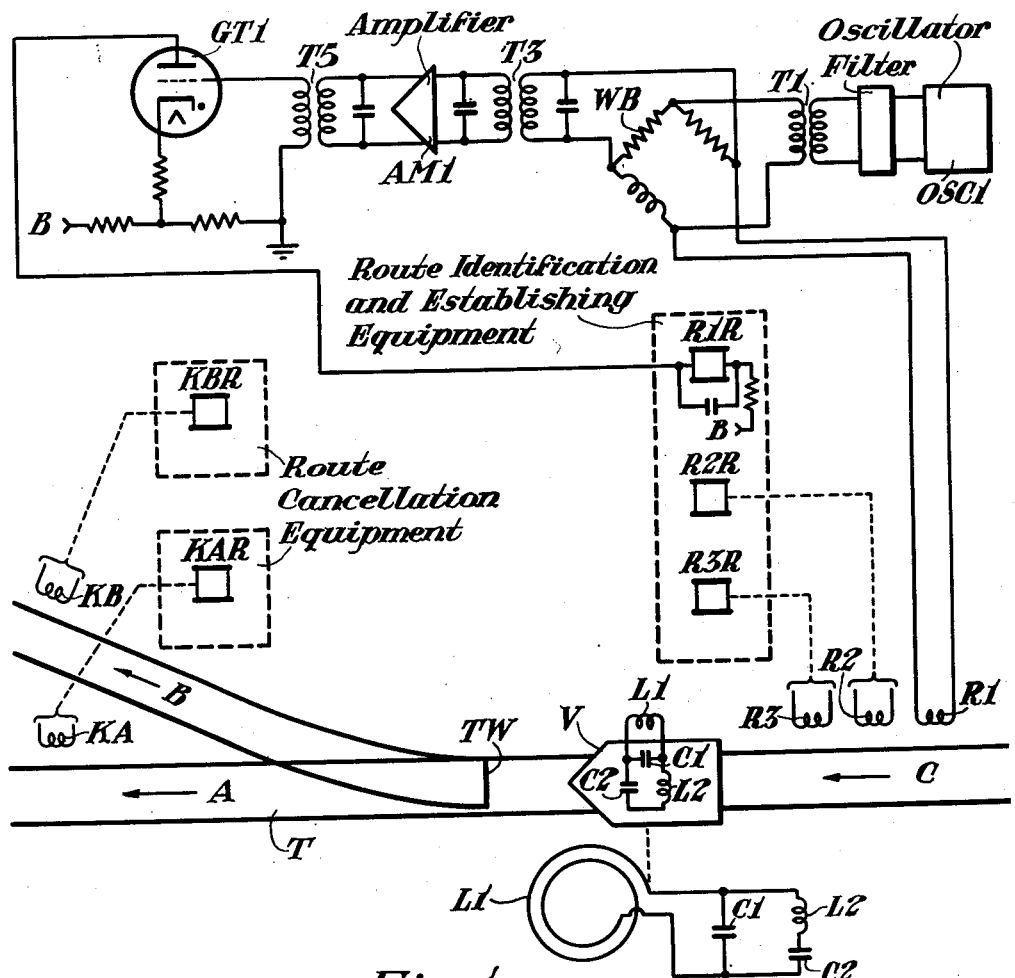

INVENTOR.
David L. Gunn
BY W. L. Stout
HIS ATTORNEY

United States Patent Office 2,790,071
Patented Apr. 23, 1957

2,790,071

VEHICLE REPORTING SYSTEMS

David L. Gunn, Swissvale, Pa., assignor to Westinghouse Air Brake Company, Wilmerding, Pa., a corporation of Pennsylvania Application October 17, 1951, Serial No. 251,709

2 Claims. (Cl. 246—124)

My invention relates to vehicle reporting systems of the inductive type, and particularly to an improved arrangement of the train-carried elements in systems of this type.

In Letters Patent of the United States No. 2,673,292, granted on March 23, 1954, to Richard W. Treharne, Jr., for Vehicle Reporting Systems, and in a copending application for Letters Patent of the United States, Serial No. 213,776, filed on March 3, 1951, by Richard W. Treharne, Jr., now Patent No. 2,753,550, and both assigned to the assignee of the present application, there are shown several arrangements for providing the identification of vehicles passing a particular point along their common route of travel, depending upon the destination and/or class of each vehicle.

In these systems, apparatus is provided at the wayside location where the identification of the passing vehicles is to be established, which wayside apparatus includes one or more wayside coils, connected with associated equipment for supplying thereto energy of one or more distinctive frequencies. Each of the vehicles is provided with a coil that is adapted to have an inductive relationship with the wayside coils when a vehicle passes the reporting point. These vehicle-carried coils are tuned to a particular frequency in accordance with the destination and/or class of the vehicle upon which they are mounted, and the apparatus is arranged and constructed so that the passage of a vehicle-carried coil tuned to a particular frequency will cause the response of the wayside equipment to thereby distinctively identify the class or destination of the passing vehicle.

It has been proposed to provide equipment of this kind in connection with the automatic control of interlockings, particularly at junction points on a railway system, to establish a route through the interlocking in accordance with the destination of the train approaching the interlocking. One such an arrangement of this type is shown and described in Letters Patent of the United States No. 2,670,434, granted February 23, 1954, to Henry J. Groenendale, for Train Describer System. In the Groenendale patent, the identification of the approaching train is established by means of apparatus as shown in the Treharne patents, above noted, and a corresponding route is established through the interlocking. When the train passes the interlocking or junction point the circuits and routes set up by the identification of the vehicle are cancelled by operation of equipment located at a point adjacent the interlocking. Such cancellation may provide for restoring the track switches to a predetermined position or may release the switches for subsequent operation to set up another route.

It has previously been proposed to provide such cancellation by two different methods. First, as shown in the Groenendale patent, a second set of apparatus for each of the identification frequencies involved is provided at a point adjacent the interlocking so that if a train having a particular identification approaches the interlocking plant, and sets up a route therethrough, and then passes the cancellation point, the apparatus at the cancellation point associated with the particular frequency of that vehicle identification will operate to cause cancellation of the route involved. This system requires as many sets of wayside apparatus at each cancellation point as the number of identifications involved at the location in question, thereby greatly increasing the amount of wayside apparatus required. A second method which has been proposed is to make use of an individual cancellation frequency, and to provide separate sets of coils on each of the vehicles, one of which is tuned to the identification frequency of the vehicle and the other to the cancellation frequency, which is common to all vehicles, so that when a train passes through an interlocking plant the coil on the vehicle which is tuned to the cancellation frequency will cause the operation of the wayside equipment tuned to that frequency. The second method requires only a single set of wayside apparatus at the cancellation point, but is not advantageous because it requires the use of two separate coils on each vehicle.

It is therefore an object of my invention to provide a train identification system in which a single vehicle-carried coil may be tuned to respond selectively to either of two frequencies, one of which is selected in accordance with the route or destination of the vehicle, and the other of which is selected to operate the wayside cancellation equipment, and which is a common frequency for all vehicles regardless of the identification frequency associated with the vehicle.

Another object of my invention is to provide vehicle-carried means for operating the wayside equipment of the train identification systems of the type described, in which a single vehicle-carried coil is used and is tuned to different frequencies by means of multiple resonant circuits connected thereto.

Another object of my invention is to provide improved vehicle-carried means for causing the response of the wayside train identification apparatus by the inductive action of the vehicle-carried coil, which has associated therewith circuit elements for causing the vehicle-carried coil to inductively influence the wayside equipment at a selected one of several frequencies dependent upon the class or destination of the vehicle and to also cause the operation of other wayside equipments tuned to a common or cancellation frequency which is common to all vehicles regardless of their class or destination.

Other objects of my invention and features of novelty thereof will be apparent from the following description taken in connection with the accompanying drawings.

In practicing my invention, I provide, in a system of the type described in the aforementioned Treharne patents, a vehicle-carried coil adapted to be mounted on a vehicle and having connected thereto reactive circuit elements which are selected and arranged so as to cause the circuit arrangement to be resonant at a plurality of frequencies, one of which is common to each of the vehicles, and the other frequencies of which are selected in accordance with the class or destination of the vehicle. The wayside equipment is selected and arranged so that the apparatus used for cancellation is influenced by the vehicle-carried circuit which is tuned to the common or cancellation frequency, and the identification apparatus is influenced by the same circuit, which is also tuned to a frequency selected according to the class or destination of the vehicle.

I shall describe two forms of vehicle reporting systems embodying my invention and shall then point out the novel features thereof in claims.

Figure 2:
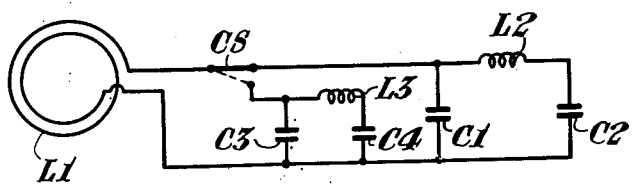

The accompanying drawings show two arrangements which may be employed in connection with systems of this type. In Fig. 1, there is shown an arrangement wherein the circuit including the vehicle-carried coil is tuned to two frequencies by means of an associated capacitor and a series resonant circuit comprising an auxiliary reactor and capacitor. Fig. 2 shows an arrangement whereby the circuit including the coil may be tuned to a combination of two of three frequencies, by providing auxiliary resonant circuits which are selected by a suitable switch.

Referring to Fig. 1, the reference character T designates a stretch of railway track having located therein a track switch TW for the purpose of diverting trains to one or the other of two routes. It will be assumed that the vehicles travel over this stretch of track in the direction from right to left, as indicated by the arrows, that is, from the location C to the destinations A or B depending upon whether the track switch TW is normal or reverse. The apparatus for controlling the track switch TW is not shown herein since it forms no part of my invention, but it may be arranged as shown in the aforementioned Groenendale patent, so that the track switch TW is governed to its normal or reverse position depending upon the operation of one or more of the route relays R1R, R2R, or R3R. Route identification and establishing equipment is associated with route relays R1R, R2R and R3R, as indicated schematically in the drawings. The details of this equipment may be as shown in the above-mentioned Groenendale patent.

Route relays R1R, R2R and R3R are governed by the wayside apparatus associated with the train identification apparatus, including the wayside coils R1, R2, and R3. The details of this apparatus may be arranged as shown in the aforementioned Treharne patents, since the actual form of the wayside apparatus forms no part of my invention. As shown in Fig. 1 for relay R1R, this apparatus comprises an oscillator OSC1 tuned to a first selected frequency and connected to a transformer T1 through a suitable filter. The secondary winding of transformer T1 is connected across the input terminals of a bridge WB. The tuned primary winding of an output transformer T3 is connected across the output terminals of bridge WB. Coil R1 forms one impedance arm of the bridge, and as described in the Treharne patent above referred to, the other impedance arms of the bridge are selected so that the bridge is normally balanced and no output voltage appears across the primary winding of transformer T3. When a coil carried by vehicle V tuned to resonance at two frequencies, one of which corresponds to the frequency of oscillator OS1, passes adjacent coil R1, the effective impedance of coil R1 is increased, thus unbalancing the bridge and producing a voltage across the primary winding of transformer T3. This voltage is applied to the secondary winding of transformer T3 which in turn energizes transformer T5 through amplifier AM1 and causes tube GT1 to conduct, thus picking up relay R1R which is in the plate circuit of tube GT1. As pointed out in the Treharne patent, suitable means must be provided for releasing relay R1R. The details of this releasing means forms no part of my present invention and many forms of manual and automatic circuits for this purpose are known in the art, any of which could be employed within the scope of my invention. For simplicity, and as an example of a suitable means for this purpose, a condenser is shown connected across the relay for releasing the relay after a suitable time interval, as fully described in Patent No. 2,092,851, issued September 14, 1937 to D. T. Osgood for Resetting Circuits for Gas-Filled Tubes. Identical apparatus is provided for the control of relays R2R, R3R, KAR and KBR, as indicated schematically in the drawing. The train identification equipment is located at a point sufficiently far in the rear of the track switch TW and its associated interlocking signals to permit identification of the train and subsequent setting up of the appropriate route of the train. In order to cancel the route set up for the train, cancellation equipment is provided on both routes A and B, as designated by the wayside coils KA and KB, located adjacent the main and branch tracks, as shown in the drawings. The wayside equipment associated with these coils governs the cancellation relays KAR and KBR, which may be used to operate suitable circuits, indicated schematically as route cancellation equipment in Fig. 1, to effect a cancellation of the route set up for the train, when the train passes one or the other of the two cancellation coils.

As shown in the drawings, each of the vehicles, such as the vehicle V, is equipped with a coil, adapted to be mounted in a suitable position on the vehicle to be in an inductive relationship with the wayside coils when the vehicle passes the location of the wayside coils. This vehicle-carried coil, designated by the reference character L1, is connected to a circuit made up of suitable reactive elements, such as the capacitor C1 connected across the coil and the series circuit including the auxiliary reactor L2 and the capacitor C2 also connected across the terminals of the coil L1. The coil L1 will have a predetermined amount of inductive reactance, depending upon its construction, and the tuning capacitor C1 and the series resonant circuit comprising the reactor L2 and the capacitor C2 are selected and arranged so that the circuit as a whole exhibits two resonant points, in the manner well-known and described in the art of multiple resonant circuits, for example, as shown in "Communications Engineering" by W. L. Everett. One of these resonant points is chosen to lie at the frequency which will cause a response of the cancellation equipment, this frequency being designated as the cancellation frequency, while the other frequency is chosen to correspond to the frequency of one of the wayside identification equipments, to thereby designate a particular class or destination of the vehicle. The vehicle coils on each of the vehicles operating over the system are tuned in a similar manner by proper selection of the circuit elements so that each will have a resonant point at the cancellation frequency, and will have an additional resonant frequency at one of the selected identification frequencies, in accordance with the class or destination of the vehicle involved.

It will be seen, therefore, that the passage of a vehicle carrying a coil tuned in this manner will cause the response of the appropriate identification equipment as it passes the location of this apparatus, and will additionally cause the operation of the cancellation apparatus when it passes the location of the cancellation coils. The tuning elements C1, L2, and C2, may be mounted in a suitable housing, shielded from the magnetic effect of the coil L1 and the wayside coils, and mounted thereon, to provide a compact and readily detachable structure which may be attached in any suitable way to the vehicles.

It will be seen from the foregoing that my invention provides a desirable arrangement for the operation of inductive train identification equipment and cancellation of the effects produced by the identification of the trains, which comprises a simple arrangement that can readily be adapted for use with the vehicle-carried coils, and which does not require the use of large amounts of wayside apparatus, nor does it require the use of two coils on each vehicle, as in the previously proposed systems.

In Fig. 2 of the drawings, there is shown a modification of the arrangement shown in Fig. 1, which modification consists in the provision of two separate tuning circuits, each arranged in a manner similar to the single tuning circuit shown in Fig. 1, and selectively connected to the coil by means of a control switch CS. As heretofore explained in connection with Fig. 1, all the tuning elements may be mounted in a suitably shielded housing as an integral part of the vehicle-carried coil L1, with a suitable switch mounted on the housing for connecting one or the other of the tuning networks to the coil L1. The first tuning network comprising the capacitor C1 and the reactor L2 in series with a capacitor C2 may be tuned so that the vehicle will cause a response not only in the cancellation equipment but of the train identification equipment at a particular frequency depending on the class or destination of the vehicle. If it is then desired to have the vehicle identified as having another class or destination, the control switch CS may be operated to its second position, at which time the first network is disconnected from the coil L1 and the second network comprising a capacitor C3 and the reactor L3 in series with a capacitor C4 is connected across the terminals of the coil L1. This second network would have its elements selected and arranged so that the passage of the vehicle-carried coil L1 will not only cause the response of the cancellation equipment but will cause operation of the identification apparatus at a frequency different from that for the first network. Accordingly, it will be seen that my invention may be arranged so that any one of the number of identification frequencies may be chosen but in each case the apparatus will also respond to the cancellation frequency. It will be understood by those skilled in the art that the circuit networks employed may take various forms, and are not limited to the specific examples shown.

Although I have herein shown and described only two forms of vehicle reporting systems embodying my invention, it is to be understood that various changes and modifications may be made therein within the scope of the appended claims without departing from the spirit and scope of my invention.

Having thus described my invention, what I claim is:

1. In a vehicle reporting system, in combination, a first, a second, and a third wayside means responsive to the passage of a vehicle-carried coil tuned to a first, a second or a third frequency respectively, and means for selectively causing the response of said first and said second or said second and said third wayside means as the result of the passage of a vehicle-carried coil, comprising means for selectively connecting said coil to a first or a second network of reactive elements, so that the circuit including said coil is selectively tuned to said first and said second frequencies, or tuned to said second and said third frequencies.

2. In a vehicle reporting system, in combination, a vehicle carried coil provided with means for resonating the coil to a plurality of frequencies, a first wayside apparatus provided with a plurality of coils selectively responsive to different frequencies including at least one of said plurality of frequencies for detecting the identity of the vehicle, and a second wayside apparatus provided with a single coil selectively responsive to another of said plurality of frequencies for cancelling the identification provided by said first wayside apparatus.

References Cited in the file of this patent

UNITED STATES PATENTS

| | | |
|---|---|---|
| 1,242,877 | Werner et al. | Oct. 9, 1917 |
| 1,742,617 | Shaver et al. | Jan. 7, 1930 |
| 1,770,705 | Lucas | July 15, 1930 |
| 2,122,358 | Preston | June 28, 1938 |
| 2,554,056 | Peter et al. | May 22, 1951 |
| 2,670,434 | Groenendale | Feb. 23, 1954 |